United States Patent [19]

Vercellotti et al.

[11] Patent Number: 4,962,496
[45] Date of Patent: Oct. 9, 1990

[54] TRANSMISSION OF DATA VIA POWER LINES

[75] Inventors: Leonard C. Vercellotti, Oakmont; Dirk J. Boomgaard, Monroeville, both of Pa.

[73] Assignee: ABB Power T & D Company Inc., Blue Bell, Pa.

[21] Appl. No.: 260,343

[22] Filed: Oct. 20, 1988

[51] Int. Cl.[5] ........................ H04J 15/00; H04L 27/32
[52] U.S. Cl. ........................ 370/11; 375/45; 340/310 A
[58] Field of Search ........................ 370/11, 8, 9, 12; 375/22, 44, 45, 51, 113; 332/22; 340/825.58, 310 A, 310 R

[56] References Cited

U.S. PATENT DOCUMENTS

| 2,662,116 | 12/1953 | Potier | 370/11 |
| 3,667,046 | 5/1972 | Schoolcraft | 375/22 |
| 4,112,368 | 9/1978 | Ewanus et al. | 375/22 |
| 4,387,455 | 6/1983 | Schwartz | 370/11 |

FOREIGN PATENT DOCUMENTS 2315505  10/1973  Fed. Rep. of Germany ........ 325/22

Primary Examiner—Douglas W. Olms
Assistant Examiner—Alpus Hsu
Attorney, Agent, or Firm—A. J. Rossi

[57] ABSTRACT

A method for transmitting data in the form of a sequence of data words according to PLBus communications protocol in a channel (20) carrying data transmitted, according to a different protocol, in the form of timed bursts of a signal, comprising: producing (16) a carrier which is continuous at least for the duration of each data word; angularly modulating (14, 16) the carrier in accordance with the information contained in each data word; and transmitting the angularly modulated carrier in the channel (20).

6 Claims, 1 Drawing Sheet

TRANSMISSION OF DATA VIA POWER LINES

BACKGROUND OF THE INVENTION

The present invention relates to the transmission of data over power lines, and particularly power lines which simultaneously serve as links for communications conducted according to the X-10 protocol.

A variety of systems which use power networks, for example in the home, as communication links have been proposed and developed. One group of systems, which are available, employs the X-10 protocol according to which a modulated carrier is transmitted in bursts synchronized to zero crossings of one or more mains voltage phases. According to the X-10 protocol, a binary "1" may be transmitted in the form a carrier burst at a zero crossing of the mains frequency Conversely, a binary "0" may be transmitted in the form of the absence of a carrier at a zero crossing. Information transmitted according to this protocol is detected by a receiver which senses the presence of the communications carrier during discrete intervals separated by half cycles of the mains frequency. X-10 receiving equipment monitors the power network during power voltage zero crossings and during intervals between such crossings to determine whether received carrier pulses are, in fact, X-10 transmissions. X-10 transmissions may employ, for example, a carrier frequency of the order of 120 KHz.

Another communications technique which has been proposed is known as the Electronic Industries Association PLBus power line carrier standard. As presently proposed, this standard uses an amplitude-shift-keyed carrier transmitted during successive active intervals which alternate with quiescent intervals, when no signal is present. The duration of each interval, active or quiescent, defines the value of a respective data bit. Although the interval rate according to this standard is higher than the X-10 pulse rate, there is a considerable likelihood that active and quiescent intervals of such a PLBus transmission will appear at points in time which cause this transmission to be erroneously identified by X-10 equipment as an X-10 transmission.

SUMMARY OF THE INVENTION

It is an object of the present invention to conduct PLBus transmissions which will not interfere with X-10 protocol transmissions.

A more specific object of the invention is to provide PLBus transmissions which will not be erroneously processed by X-10 receivers.

A still more specific object of the invention is to provide PLBus transmissions which are substantially free of quiescent intervals, at least during the transmission of individual data blocks.

The above and other objects are achieved, according to the present invention, by angularly modulating, i.e. frequency- or phase- shift modulating, a digital signal in order to produce a continuous signal which varies in frequency or phase in a pattern representative of the digital signal.

DESCRIPTION OF THE PREFERRED EMBODIMENTS

Figure 1:
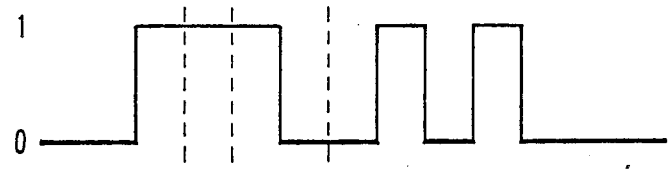
FIG. 1 is a waveform diagram showing a typical digital word pattern.
Figure 2:
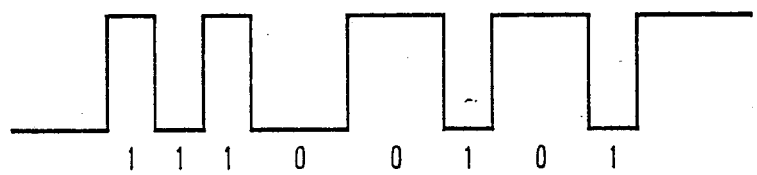
FIG. 2 is a waveform diagram of a signal according to the present invention.

FIG. 1 illustrates an exemplary digital word composed of a pattern of bits having a defined bit rate, while FIG. 2 shows the form of a modulated signal derived, in accordance with the invention, from the word of FIG. 1.

In order to generate the signal shown in FIG. 2, a digital signal is created which alternates between two amplitude values during successive periods. Each period is associated with a respective bit of the original digital word and is given a width representative of the value of the respective digital word bit. For example, as depicted in FIG. 2, each period associated with a digital word bit value of "0" has two times the width of each period associated with a digital word bit value of "1".

The end of the modulated signal representing each digital word can be terminated by an end period, EOF, having a width equal to three times that of each period associated with a digital word bit value of "1". Similarly, the end of a message can be indicated by a signal period having a width equal to four times that of each period associated with a digital word bit value.

The above-described digital signal can then be employed to frequency or phase modulate a carrier, frequency modulation being preferred.

Figure 3:
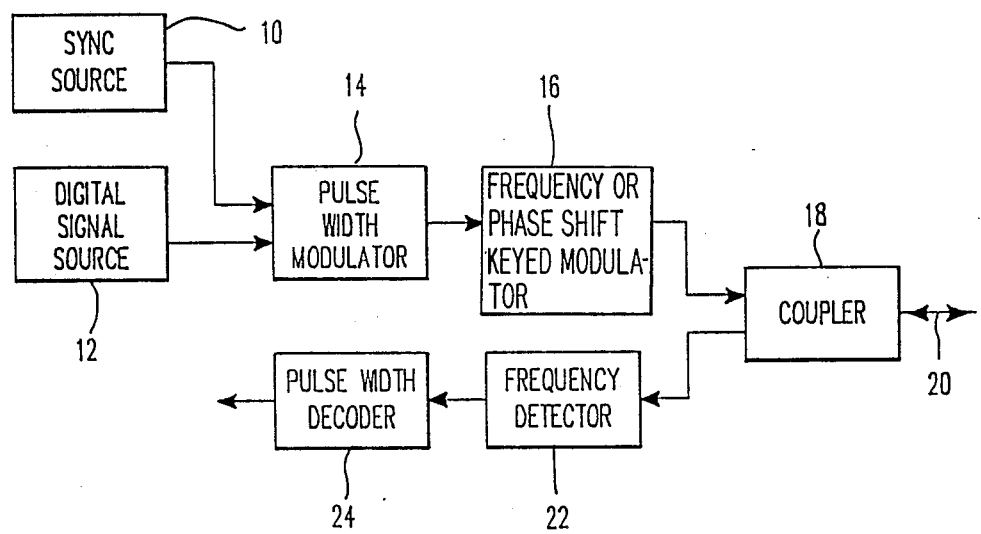
FIG. 3 is a block circuit diagram of a communication unit according to the present invention.

An exemplary circuit for performing communications according to the invention is shown in FIG. 3.

A digital signal such as that shown in FIG. 1 is supplied by a digital signal source 12 to a pulse width modulator 14, together with a sync signal supplied by a sync source 10. Sync source 10 provides a clock signal at the bit rate of the signal supplied by source 12 and thus informs modulator 14 of the start of each bit of the signal supplied by source 12.

Pulse width modulator 14 produces a pulse width modulated signal varying in amplitude so as to have an amplitude waveform corresponding to that shown in FIG. 2.

The signal produced by modulator 14 is conducted to a frequency or phase shift keyed modulator 16 producing an output signal which varies in frequency or phase in the manner illustrated in FIG. 2. This signal is applied by a bi-directional coupler 18 to power network 20. Coupler 18 can be connected between any two conductors or one conductor and ground of the power network.

PLBus signals supplied to network 20 from other locations are conducted by coupler 18 to a frequency detector 22 which produces an output signal corresponding to that produced by modulator 14. The output signal from detector 22 is then delivered to a pulse width decoder 24 which reconstitutes the original digital signal.

According to an exemplary embodiment of the invention, modulator 16 can be a frequency shift keyed modulator which produces an output signal which varies between the frequencies $f_1 = 120$ KHz and $f_2 = 110$ KHz.

During an on-going transmission by a device operating in accordance with the present invention, an X-10 transmission cannot take place. In order to permit X-10 transmissions to be conducted over the same power network as transmissions according to the invention, the latter transmissions could be conducted in such a manner that a quiescent period is provided after each block of data, which may consist, for example, of 22 digital words. Alternatively, delays in X-10 transmissions could be reduced by effecting transmissions according to the present invention so that a quiescent period is created between the transmissions of successive digital words.

As is apparent from a consideration of FIGS. 1 and 2, the width of each original digital word is fixed, while the width of each corresponding word produced by modulator 14 is variable, depending on the bit pattern thereof. In order to compensate for this difference, the original digital words supplied by source 16 can be temporarily stored in a buffer in order to be supplied to modulator 14 at appropriate intervals. The period between transmission of successive data blocks will be made sufficient to assure that the original digital words of one block have been converted to modulated form before a subsequent block is transmitted to modulator 14.

While the description above shows particular embodiments of the present invention, it will be understood that many modifications may be made without departing from the spirit thereof. The pending claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for transmitting data via a power line which also carries a mains voltage which varies in amplitude to have a succession of zero crossings which occur at the frequency of the mains voltage, the data being contained in a sequence of binary data words each containing information, and the data being transmitted over the power line according to a first communications protocol which provides a signal varying between two signal states during successive intervals, with the duration of each interval defining the value of a respective data word bit, the power line also being connected to carry data according to a different protocol in which bursts of a signal are synchronized to zero crossings of the mains voltage, said method comprising: producing a carrier which is continuous at least for the duration of each data word; angularly modulating the carrier in accordance with the information contained in each data word; and transmitting the continuous angularly modulated carrier over the power line.

2. A method as defined in claim 1 wherein said step of angularly modulating the carrier comprises varying the carrier modulation state alternatingly between two distinct modulation states in a time pattern representative of the information contained in each data word.

3. A method as defined in claim 2 wherein said step of angularly modulating comprises frequency modulating the carrier.

4. A method as defined in claim 2 wherein said step of angularly modulating comprises phase modulating the carrier.

5. A method as defined in claim 2 wherein the period during which the carrier modulation has a respective modulation state corresponds to the value of an associated bit of the data word.

6. A method as defined in claim 1 further comprising periodically interrupting transmission of data according to the first protocol for allowing transmission of data according to the different protocol during periods when transmission according to the first protocol is interrupted.

* * * * *